US012793743B2

(12) United States Patent
Kobayashi et al.

(10) Patent No.: US 12,793,743 B2
(45) Date of Patent: Nov. 10, 2026

(54) MAGNETIC DISK DEVICE AND METHOD OF RECORDING DATA

(71) Applicants: KABUSHIKI KAISHA TOSHIBA, Kanagawa (JP); TOSHIBA ELECTRONIC DEVICES & STORAGE CORPORATION, Kanagawa (JP)

(72) Inventors: Ryo Kobayashi, Tokyo (JP); Akio Mizuno, Tokyo (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 19/306,613

(22) Filed: Aug. 21, 2025

(65) Prior Publication Data

US 2026/0245591 A1 Aug. 20, 2026

(30) Foreign Application Priority Data

Feb. 17, 2025 (JP) ................................ 2025-023515

(51) Int. Cl.

*G11B 27/10* (2006.01)
*G11B 5/012* (2006.01)
*G11B 5/09* (2006.01)
*G11B 27/36* (2006.01)

(52) U.S. Cl.

CPC ............ *G11B 27/105* (2013.01); *G11B 5/012* (2013.01); *G11B 5/09* (2013.01); *G11B 27/36* (2013.01)

(58) Field of Classification Search

None

See application file for complete search history.

(56) References Cited

U.S. PATENT DOCUMENTS

| | | | | | |
|---|---|---|---|---|---|
| 5,664,143 | A * | 9/1997 | Olbrich | G06F 3/0659 | 711/112 |
| 6,574,676 | B1 * | 6/2003 | Megiddo | G06F 3/0659 | 711/158 |
| 6,789,163 | B2 * | 9/2004 | Fox | G06F 3/0611 | 711/E12.019 |
| 7,730,256 | B2 * | 6/2010 | Flake | G06F 12/0868 | 710/52 |
| 9,298,393 | B2 * | 3/2016 | See | G06F 12/0868 | |

(Continued)

*Primary Examiner* — Fred Tzeng

(74) *Attorney, Agent, or Firm* — Knobbe, Martens, Olson & Bear, LLP

(57) ABSTRACT

In a magnetic disk device to be connected to a host, the host includes an input/output scheduler that groups a command request by any units. The input/output scheduler operates in one of a first scheduler switching system and a second scheduler switching system, in which switching is performed by a certain time and by a certain number of bytes for a command group including a plurality of write command requests, respectively. A controller of the magnetic disk device records any number of command requests while processing a command request that has been received, determines a transfer rate from a command request that has been recorded, and records the transfer rate, and compares the transfer rate that has been determined with a reference transfer rate, to determine whether the input/output scheduler operates in the first scheduler switching system or in the second scheduler switching system based on the comparison result.

12 Claims, 9 Drawing Sheets

(56) References Cited

U.S. PATENT DOCUMENTS

| | | | | |
|---|---|---|---|---|
| 10,635,617 | B2 * | 4/2020 | Jinn | G06F 13/374 |
| 11,640,264 | B2 * | 5/2023 | Benisty | G06F 3/0679<br>711/154 |
| 12,417,053 | B2 * | 9/2025 | Sharma | G06F 3/0659 |
| 12,436,877 | B2 * | 10/2025 | Segev | G06F 12/023 |
| 2007/0005882 | A1 | 1/2007 | Gallagher et al. | |
| 2011/0196996 | A1 | 8/2011 | Goyal | |
| 2015/0026398 | A1 | 1/2015 | Kim | |
| 2023/0367514 | A1 * | 11/2023 | Wang | G06F 3/0655 |
| 2024/0319913 | A1 * | 9/2024 | Akavaram | G06F 3/061 |

* cited by examiner

MAGNETIC DISK DEVICE AND METHOD OF RECORDING DATA

CROSS-REFERENCE TO RELATED APPLICATIONS

This application is based upon and claims the benefit of priority from Japanese Patent Application No. 2025-023515, filed on Feb. 17, 2025; the entire contents of which are incorporated herein by reference.

FIELD

An embodiment described herein relates generally to a magnetic disk device and a method of recording data.

BACKGROUND

There are various types of I/O schedulers mounted on hosts. For example, a completely fair queueing (CFQ) scheduler and a budget fair queueing (BFQ) scheduler are adopted for an operating system (OS) of Linux (registered trademark).

In the CFQ, a scheduler is switched by a certain time. In the BFQ, the scheduler is switched for each of the certain numbers of bytes.

In conventional techniques, however, there is, on the side of a drive such as a hard disk drive (HDD), no method of determining what type of I/O scheduler such as the BFQ and the CFQ is used by a host and operates.

One of problems of the embodiment is to reduce useless seeking, reduce an idling occurrence rate, improve a transfer rate, and thereby improve drive performance.

DETAILED DESCRIPTION

According to an embodiment, a magnetic disk device is to be connected to a host. The host includes an input/output scheduler that groups command requests by any units. The input/output scheduler operates in one of a first scheduler switching system and a second scheduler switching system. Switching is performed by a certain time for a command group including a plurality of write command requests in the first scheduler switching system. Switching being performed by a certain number of bytes for the command group in the second scheduler switching system. The magnetic disk device includes a magnetic disk, a magnetic head, and a controller. The magnetic disk includes a plurality of tracks and including a plurality of data sectors on each of the plurality of tracks. The magnetic head operates in response to command requests of read and write on the plurality of data sectors of the magnetic disk. The controller performs control at a time of performing read and write on the plurality of data sectors with the magnetic head in response to the command requests when receiving, from the host, a command pattern that includes a plurality of command groups and in which the plurality of command groups are switched at certain timing. The controller records any number of command requests while processing a command request that has been received; determines a transfer rate from a command request that has been recorded, to record the transfer rate; and compares the transfer rate that has been determined with a reference transfer rate, to determine whether the input/output scheduler operates in the first scheduler switching system or in the second scheduler switching system based on a comparison result.

The magnetic disk device according to the embodiment will be described in detail below with reference to the accompanying drawings. Note that the embodiment does not limit the present invention.

Figure 1:
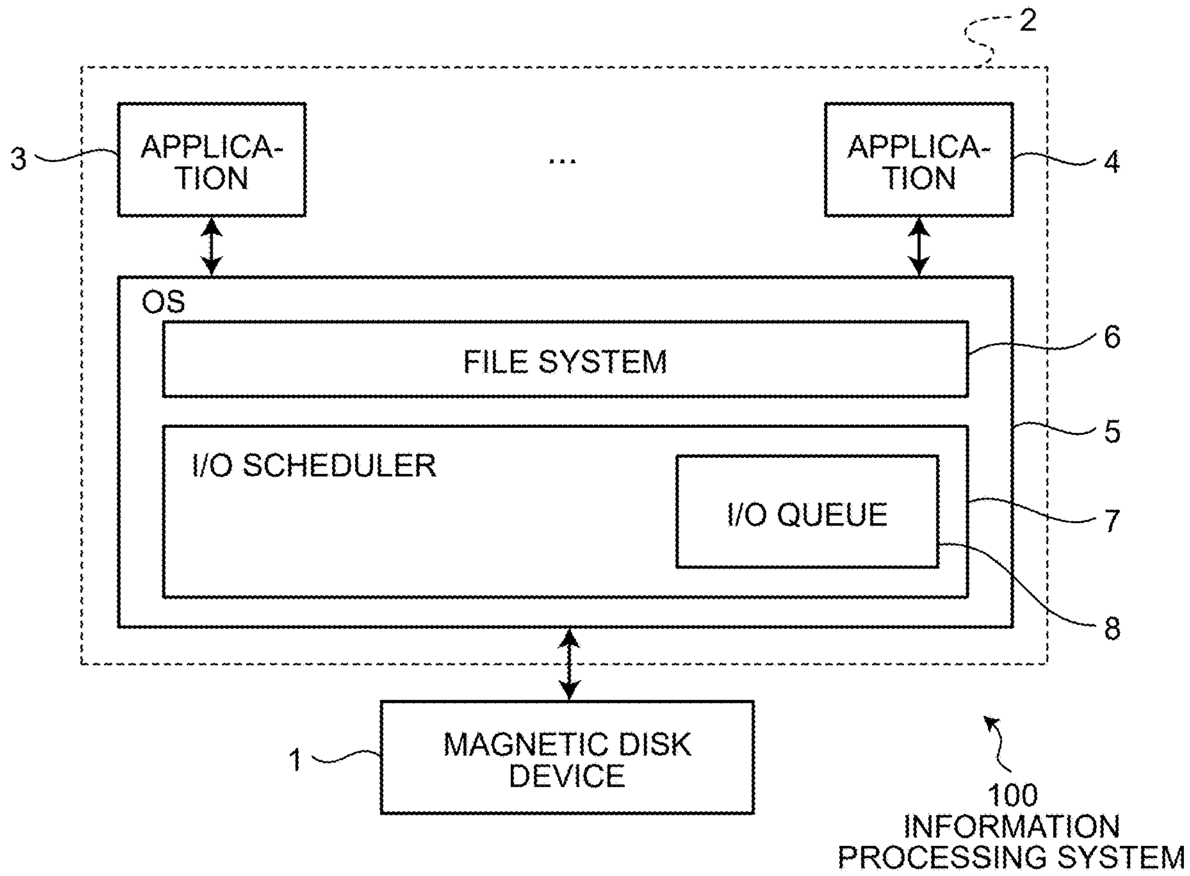
FIG. 1 is a block diagram illustrating an example of a system configuration of an information processing system according to an embodiment.

FIG. 1 is a block diagram illustrating an example of a system configuration of an information processing system according to the embodiment. An information processing system 100 includes a magnetic disk device 1 and a host 2. The magnetic disk device 1 can be connected to the host 2. A standard of a communication path between the magnetic disk device 1 and the host 2 is not limited to a specific standard. In an example, a serial attached SCSI (SAS) can be adopted as a standard of a communication path between the magnetic disk device 1 and the host 2.

The magnetic disk device 1 receives an access command from the host 2, and performs read and write on a magnetic disk.

Examples of the host 2 include a processor, a personal computer, and a server. The host 2 mainly includes applications 3 and 4 and an OS 5.

The applications 3 and 4 are software that runs on the OS 5. A user appropriately installs the applications 3 and 4 for use.

The OS 5 is software necessary for operating the host 2. In the embodiment, an example in which Linux (registered trademark) is used as the OS 5 will be described.

The OS 5 mainly includes a file system 6 and an I/O scheduler 7.

The file system 6 serves as an interface that is connected to the magnetic disk device 1 and that manages data. This enables the OS 5 to access data stored in the magnetic disk device 1 via the file system 6.

The I/O scheduler 7 groups command requests input by the host 2 by any units, and determines when to issue and transmit a command to the magnetic disk device 1.

The I/O scheduler 7 includes one or more I/O queues 8. When the I/O scheduler 7 receives a plurality of grouped commands, that is, a command group, one or more I/O queues 8 store the command group.

Figure 2:
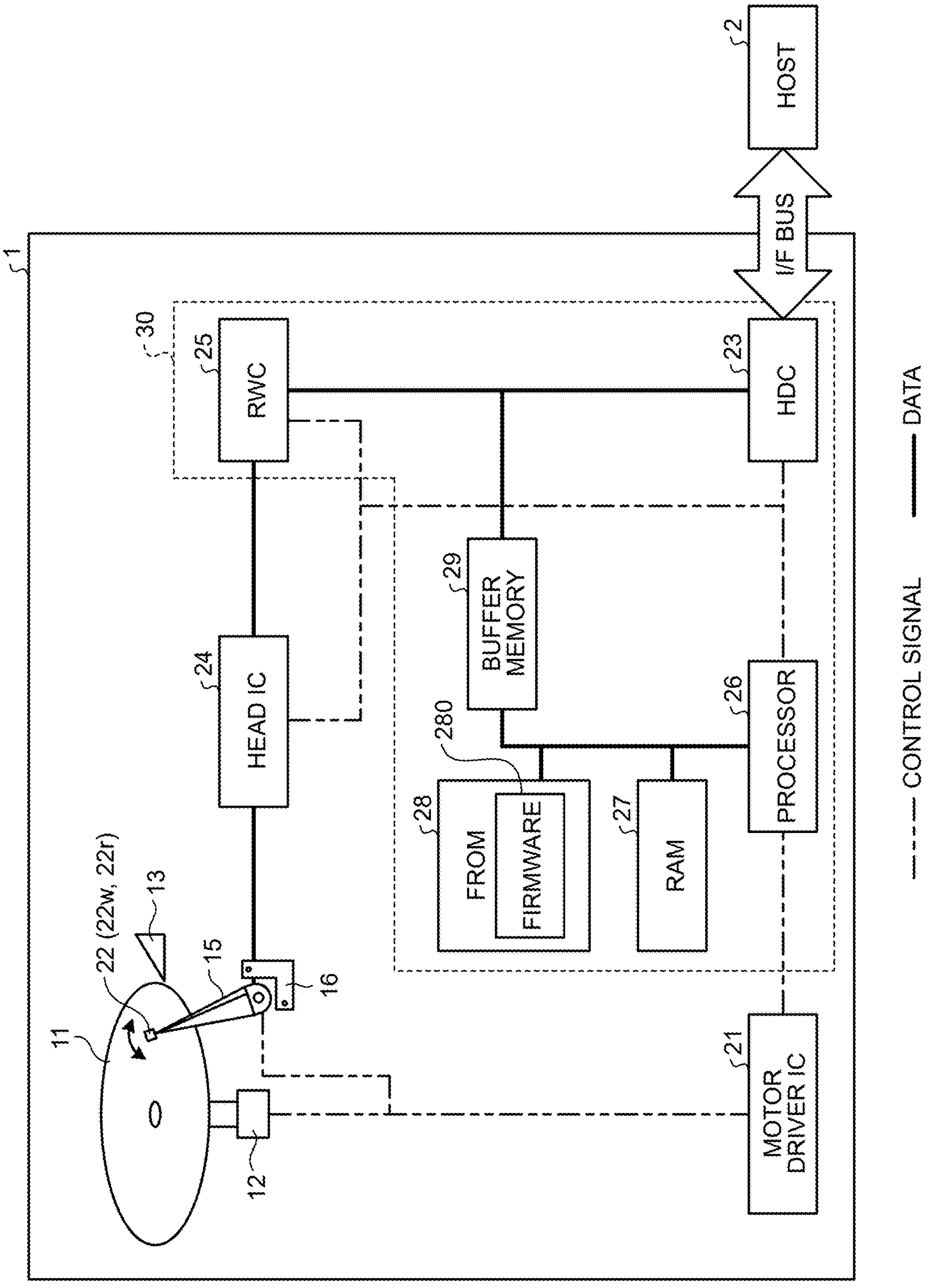
FIG. 2 is a schematic diagram illustrating an example of a configuration of a magnetic disk device of the embodiment.

FIG. 2 is a schematic diagram illustrating an example of a configuration of the magnetic disk device of the embodiment.

The magnetic disk device 1 is connected to the host 2. The magnetic disk device 1 can receive an access command such as a write command and a read command from the host 2.

The magnetic disk device 1 includes a magnetic disk 11 on a surface of which a recording surface is formed. The magnetic disk device 1 writes and reads data to and from the magnetic disk 11 (more accurately, recording surface of magnetic disk 11) in accordance with the access command. Note that, although the magnetic disk device 1 can include a plurality of magnetic disks 11, the magnetic disk device 1 includes one magnetic disk 11 in the embodiment for simplicity of description and illustration.

Data is written and read via a magnetic head 22. Specifically, in addition to the magnetic disk 11, the magnetic disk device 1 includes a spindle motor 12, a motor driver integrated circuit (IC) 21, the magnetic head 22, an actuator arm 15, a voice coil motor (VCM) 16, a ramp 13, a head IC 24, a read write channel (RWC) 25, a RAM 27, a flash read only memory (FROM) 28, a buffer memory 29, a hard disk controller (HDC) 23, and a processor 26.

The spindle motor 12 attached to a rotation shaft of the magnetic disk 11 rotates the magnetic disk 11 at a predetermined rotation speed. The motor driver IC 21 drives the spindle motor 12.

The motor driver IC 21 controls rotation of the spindle motor 12 and rotation of the VCM 16.

The magnetic head 22 includes a write element 22*w* and a read element 22*r*. The magnetic head 22 writes and reads data to and from data sector of the magnetic disk 11 with the write element 22*w* and the read element 22*r*. Furthermore, the magnetic head 22 is attached to a distal end of the actuator arm 15. The VCM 16 moves the magnetic head 22 along the radial direction of the magnetic disk 11. The motor driver IC 21 drives the VCM 16. Such an operation is referred to as seeking.

For example, when the rotation of the magnetic disk 11 is stopped, the magnetic head 22 is moved onto the ramp 13. The ramp 13 holds the magnetic head 22 at a position spaced apart from the magnetic disk 11.

During a read operation, the head IC 24 amplifies a signal read by the magnetic head 22 from the magnetic disk 11, outputs the signal, and supplies the signal to the RWC 25. Furthermore, during a write operation, the head IC 24 amplifies a signal in accordance with data to be written supplied from the RWC 25, and supplies the signal to the magnetic head 22.

The HDC 23 controls transmission and reception of data to and from the host 2 via an I/F bus, and controls the buffer memory 29, for example.

The buffer memory 29 is used as a buffer for data transmitted to and received from the host 2. For example, the buffer memory 29 is used for temporarily recording data to be written to the magnetic disk 11 or data read from the magnetic disk 11.

The buffer memory 29 includes, for example, a volatile memory capable of high-speed operation. The type of a memory constituting the buffer memory 29 is not limited to a specific type. For example, the buffer memory 29 can include a dynamic random access memory (DRAM), a static random access memory (SRAM), or a combination thereof.

The RWC 25 performs modulation including error correction coding on data to be written supplied from the HDC 23. The RWC 25 performs demodulation including error correction on a signal to which the modulated data has been supplied from the head IC 24. The RWC 25 outputs digital data obtained by the demodulation to the HDC 23.

The processor 26 is, for example, a central processing unit (CPU). The RAM 27, the flash read only memory (FROM) 28, and the buffer memory 29 are connected to the processor 26.

The FROM 28 is a nonvolatile memory. The FROM 28 stores firmware 280 (program data), various operation parameters, and the like. Although being stored in the FROM 28 in FIG. 2, the firmware 280 may be stored in the magnetic disk 11.

The RAM 27 includes, for example, a DRAM, an SRAM, or a combination thereof. The processor 26 uses the RAM 27 as a memory for operation. The RAM 27 is used as a region for loading the firmware 280 and a region for holding various pieces of management data.

The processor 26 entirely controls the magnetic disk device 1 in accordance with the firmware 280 stored in the FROM 28 or the magnetic disk 11. For example, the processor 26 loads the firmware 280 from the FROM 28 or the magnetic disk 11 to the RAM 27, and controls the motor driver IC 21, the head IC 24, the RWC 25, the HDC 23, and the like in accordance with the loaded firmware 280.

Note that a configuration including the RWC 25, the processor 26, the HDC 23, the processor 26, the RAM 27, the FROM 28, and the buffer memory 29 can also be regarded as a controller 30. The controller 30 can be configured as a system-on-a-chip (SoC). The controller 30 is not necessarily required to be configured as the SoC. The controller 30 may have a configuration without the FROM 28, the RAM 27, and the buffer memory 29.

Figure 3:
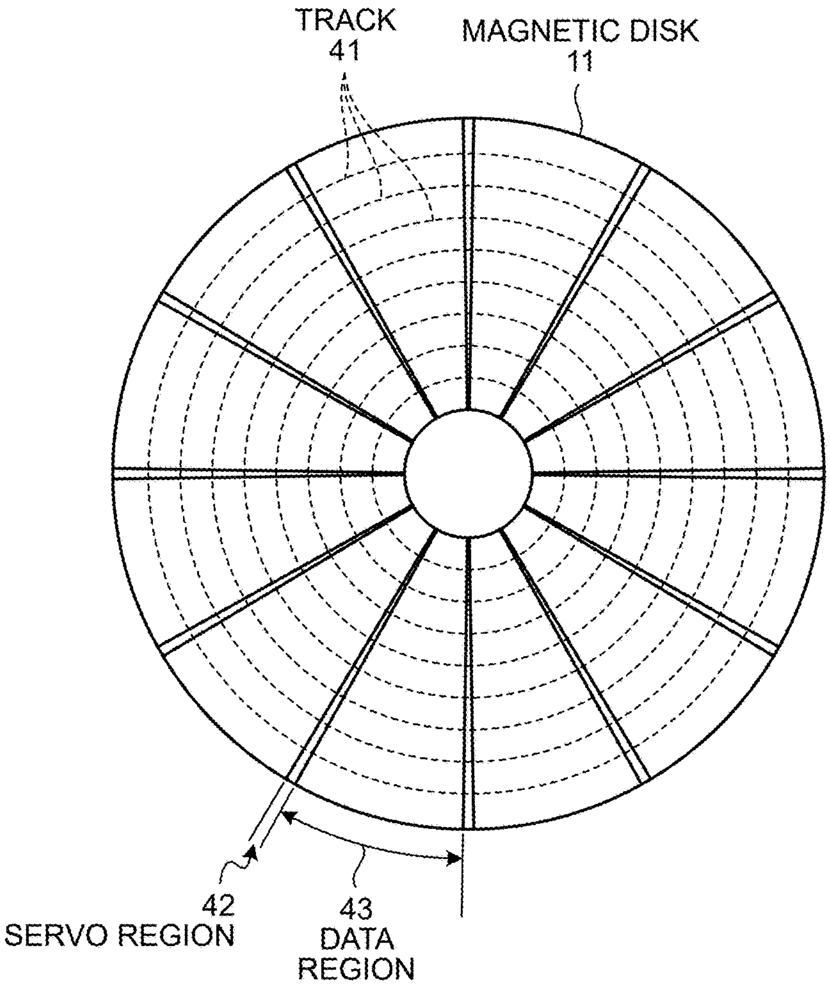
FIG. 3 is a schematic diagram illustrating an example of a configuration of a magnetic disk according to the embodiment.

FIG. 3 is a schematic diagram illustrating an example of a configuration of the magnetic disk according to the embodiment.

In a manufacturing process, servo information is written to the magnetic disk 11 by, for example, a servo writer or self-servo write (SSW). FIG. 3 illustrates radially arranged servo regions 42 in an example of the arrangement of the servo regions 42 in which the servo information is written. Data regions 43 in which data can be written are provided between the servo regions 42.

A plurality of concentric tracks 41 is set in the radial direction of the magnetic disk 11 based on the servo information. A plurality of data sectors in which data is to be written is arranged in the plurality of data regions 43 provided along the tracks 41.

The servo information includes a servo mark, a gray code, a burst pattern, and a post code. When data is written and read in a data sector, the controller 30 generates a positional error signal (PES) based on the servo information read by the magnetic head 22 from a servo region 42. The PES indicates the degree of deviation of a target track from a track center. The controller 30 executes positioning of the magnetic head 22, that is, seeking control and tracking control based on PESs acquired each time the magnetic head 22 passes through the servo region 42.

The function of the firmware 280 mounted on the controller 30 in the embodiment will be described below.

Figure 4:
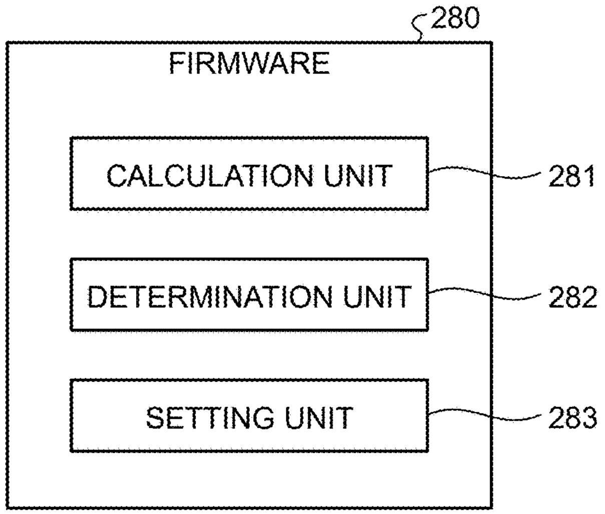
FIG. 4 illustrates an example of a functional configuration of firmware according to the embodiment.

FIG. 4 illustrates an example of a functional configuration of firmware according to the embodiment.

As illustrated in FIG. 4, the firmware 280 includes a calculation unit 281, a determination unit 282, and a setting unit 283.

When receiving a command group including a plurality of write command requests from the host 2, the calculation unit 281 records command groups by the number of command groups configured at the time of performing sequential write. Moreover, times and transfer rates from the sequential write to switching to the next command group are recorded for the stored command groups. Furthermore, the number of bytes is determined by multiplying a command block size by the number of commands included in the command group with the timing of switching from a command group to another command group as a boundary.

The determination unit 282 determines in which of the BFQ and the CFQ the I/O scheduler 7 mounted on the host 2 operates based on a transfer rate calculated by the calculation unit 281.

The CFQ is a type of scheduler switching system in which the I/O scheduler 7 switches a scheduler by a certain time for a command group in which the host 2 has a plurality of write command requests.

The CFQ is an example of a first scheduler switching system.

The BFQ is a type of scheduler switching system in which the I/O scheduler 7 switches a scheduler by the certain number of bytes for a command group in which the host 2 has a plurality of write command requests.

The BFQ is an example of a second scheduler switching system.

For example, the setting unit 283 sets the number of command patterns to be recorded. The setting unit 283 sets a time when a scheduler is switched at the time when sequential write is performed for a plurality of command groups and at the time when a designated command group among the plurality of command groups is first processed. The setting unit 283 sets a value of a reference transfer rate used for determining which of the BFQ or the CFQ is adopted. The setting unit 283 adjusts the time point when write is interrupted at the time when the scheduler is switched by time and the number of bytes.

Details of these values will be described later in the following paragraphs.

Figure 5:
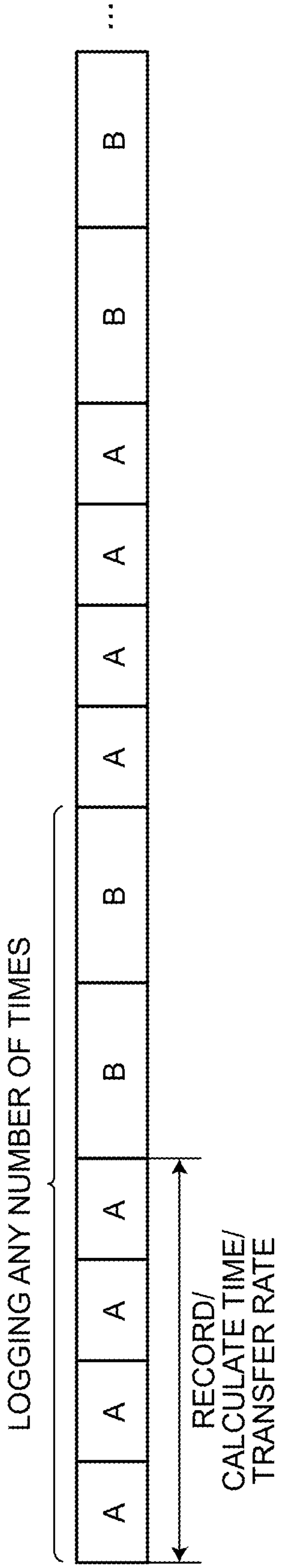
FIG. 5 illustrates an example of a functional configuration of the firmware at the time of performing sequential write according to the embodiment.

FIG. 5 illustrates an example of a functional configuration of firmware at the time of performing sequential write according to the embodiment.

In FIG. 5, it is assumed that the host 2 uses the I/O scheduler 7 to transmit a sequential write command including a command group of commands A and a command group of commands B. The sequential write command has a command pattern in which the command groups are switched at certain timing.

In FIG. 5, the timing when the magnetic disk device 1 performs sequential write is used as a trigger. Meanwhile, the magnetic disk device 1 logs any number of received command patterns while processing received commands with a thread.

It may be made possible for the setting unit 283 to set the number of command patterns to be logged.

When first processing a designated command group in a command pattern including a plurality of command groups, the controller 30 performs processing by switching sequential write by any time set by the setting unit 283.

Next, the controller 30 processes the designated command group. The controller 30 causes the calculation unit 281 to determine the time when the logged and designated command group is switched to another command group. The controller 30 switches sequential write by the determined switching time, and responds to the host 2.

The calculation unit 281 holds the time of switching of the logged and designated command group as described above.

Moreover, when processing of any number of command requests among command patterns to be logged set by the setting unit 283 is completed, the calculation unit 281 calculates a transfer rate, and holds the value.

In a method of calculating a transfer rate, the switching time and the number of bytes of designated command groups are determined by processing the logged command. The transfer rate can be calculated by dividing the number of bytes by the switching time.

Next, the determination unit 282 compares the transfer rate calculated by the calculation unit 281 with the reference transfer rate preliminarily set by the setting unit 283.

When the transfer rate calculated by the calculation unit 281 exceeds the reference transfer rate preliminarily set by the setting unit 283, the determination unit 282 determines that the command pattern transmitted from the host 2 is switched by time. In other words, the determination unit 282 determines that the I/O scheduler 7 mounted on the host 2 operates in the CFQ.

Then, the controller 30 switches sequential write by the switching time held by the calculation unit 281.

Here, a case where the transfer rate exceeds the reference transfer rate may include a case where the transfer rate is equal to or more than the reference transfer rate.

When the transfer rate calculated by the calculation unit 281 does not exceed the reference transfer rate preliminarily set by the setting unit 283, the determination unit 282 determines that the command pattern transmitted from the host 2 is switched by the number of bytes. In other words, the determination unit 282 determines that the I/O scheduler 7 mounted on the host 2 operates in the BFQ.

Then, the controller 30 switches sequential write by the number of bytes held by the calculation unit 281.

Here, a case where the transfer rate does not exceed the reference transfer rate may include a case where the transfer rate is equal to or less than the reference transfer rate.

In a method of calculating the number of bytes, the number of bytes is determined by multiplying a command block size by the number of commands included in the command group with the timing of switching from a command group to another command group as a boundary.

Command processing at the time when a command pattern is optimized will be described below.

Figure 6:
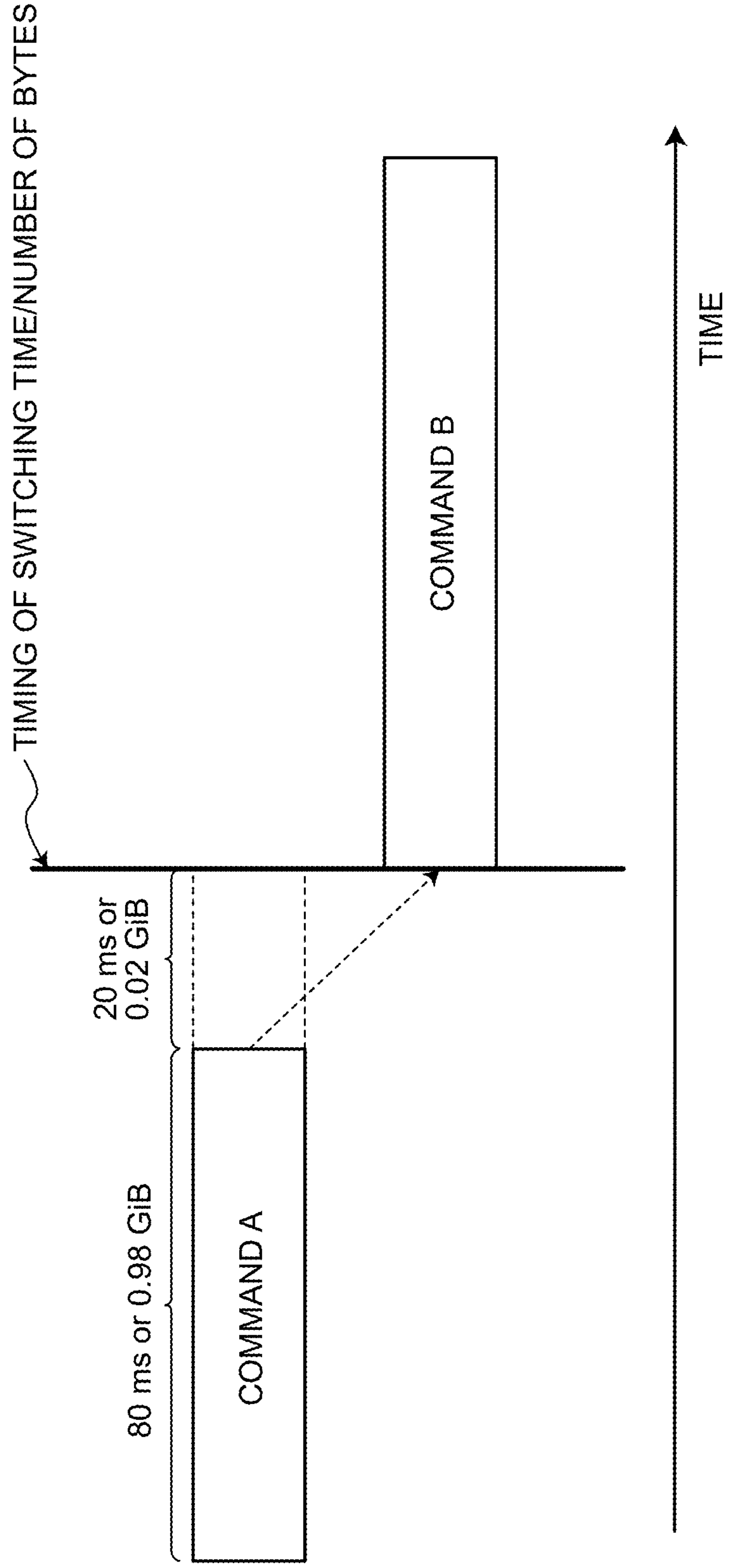
FIG. 6 illustrates an example of command processing at the time when a command pattern is optimized according to the embodiment.

FIG. 6 illustrates an example of the command processing at the time when a command pattern is optimized according to the embodiment. In FIG. 6, the horizontal axis represents time.

The principle of command switching does not differ depending on time and the number of bytes. Since the number of bytes of data to be written can thus be preliminarily predicted, selection of a data sector of a write destination target can be preliminarily predicted.

FIG. 6 illustrates seeking processing at the time when sequential write processing is completed in 100 ms in a case where the determination unit 282 determines that the sequential write processing is switched by time (i.e., in case where determination unit 282 determines that I/O scheduler 7 operates in CFQ). In this case, the controller 30 interrupts sequential write processing on a command A at the time point of 80 ms, and executes seeking to select a write destination target of a command B.

Furthermore, in a case where the determination unit 282 determines that the sequential write processing is switched by the number of bytes (i.e., in case where determination unit 282 determines that I/O scheduler 7 operates in BFQ), when the calculation unit 281 calculates the number of bytes of the command A as 1 GiB, the controller 30 interrupts the sequential write processing on the command A at the time point of 0.98 GiB, and executes seeking to select a write destination target of the command B.

The setting unit 283 can set the time point when write is interrupted at the time when the scheduler is switched by the time and the number of bytes described above. For example, setting can be made such that seeking is performed at "the time point of 80% of the time when the sequential write processing is completed".

As described above, seeking is performed after stopping command processing at a certain time point to leave time in seeking timing for the controller 30 to select, in time, a write destination target of the next command processing.

A series of processing performed by the controller 30 according to the embodiment will be described below.

Figure 7:
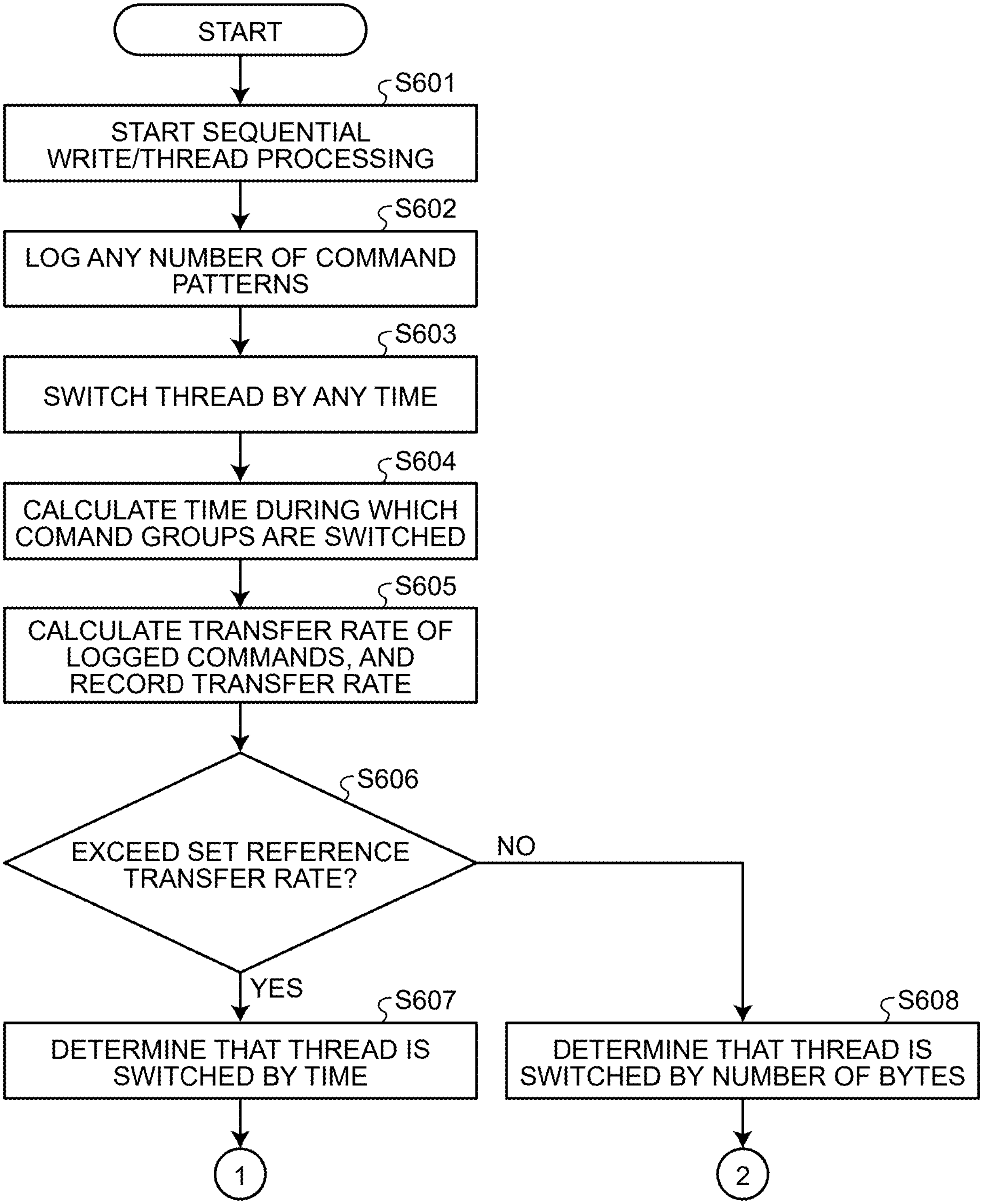
FIG. 7 is a flowchart illustrating an example of the operation of a controller mounted on the magnetic disk device according to the embodiment.

FIG. 7 is a flowchart illustrating an example of the operation of the controller mounted on the magnetic disk device according to the embodiment. In the figure, the magnetic disk device 1 executes a series of operations when receiving a command request having a command pattern including a plurality of command groups from the host 2.

When receiving a command request including a plurality of command groups from the host 2, the controller 30 starts thread processing of sequential write (S601).

While the controller 30 processes the received command, the calculation unit 281 logs the command patterns of the number preset by the setting unit 283 (S602).

When first processing a designated command group among the plurality of command groups in the command pattern, the controller 30 switches the thread processing of sequential write by the time set by the setting unit 283 (S603).

The calculation unit 281 extracts the timing when a command group is switched to another command group from the logged command pattern, and calculates a switching time from the timing (S604). After determining the switching time, in the subsequent processing, the controller 30 switches sequential write by the determined time, and responds to the host 2.

When processing any number of logged command requests, the controller 30 records the transfer rate in the section in the calculation unit 281 (S605).

Next, the determination unit 282 compares the determined transfer rate with a reference transfer rate preset by the setting unit 283 (S606).

When the determined transfer rate exceeds the reference transfer rate (S606: Yes), the determination unit 282 determines that the command pattern transmitted from the host 2 is switched by time (S607).

Processing contents in a case where the controller 30 determines that the command pattern transmitted from the host 2 is switched by time will be described below.

Figure 8:
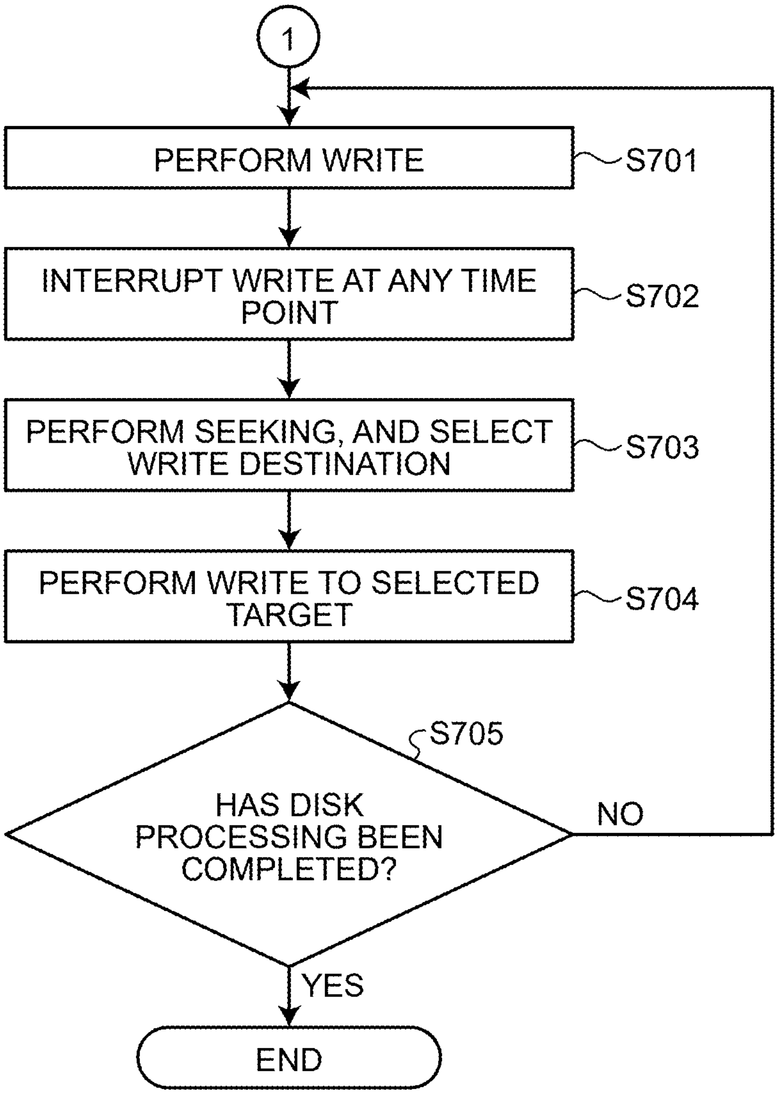
FIG. 8 is a flowchart illustrating an example of processing contents in a case where the controller according to the embodiment determines that a command pattern transmitted from a host is switched by time.

FIG. 8 is a flowchart illustrating an example of the processing contents in a case where the controller according to the embodiment determines that the command pattern transmitted from the host is switched by time.

In FIG. 8, the controller 30 performs sequential write (S701).

Next, when the time point when write is interrupted is reached at the time when a scheduler set by the setting unit 283 is switched, the controller 30 interrupts the sequential write (S702).

For example, when the calculation unit 281 calculates the time of switching of command groups as 100 ms and the setting unit 283 sets "interruption of command processing at the time of 80% arrival of the switching time", processing is interrupted in 80 ms.

Next, the controller 30 performs seeking, and selects a target destination of the magnetic disk 11 to which a command group transmitted from the host 2 is to be written next (S703).

Then, the controller 30 performs sequential write on the next command group to the selected target destination (S704).

When the sequential write is continued and disk processing is completed (S705: Yes), the processing ends.

When the disk processing remains yet (S705: No), the processing is performed again from S701.

Returning to the description of FIG. 7, the determination unit 282 compares the determined transfer rate with the reference transfer rate preset by the setting unit 283. When the determined transfer rate does not exceed the reference transfer rate (S606: No), the determination unit 282 determines that the command pattern transmitted from the host 2 is switched by the number of bytes (S608).

Processing contents in a case where the controller 30 determines that the command pattern transmitted from the host 2 is switched by the number of bytes will be described below.

Figure 9:
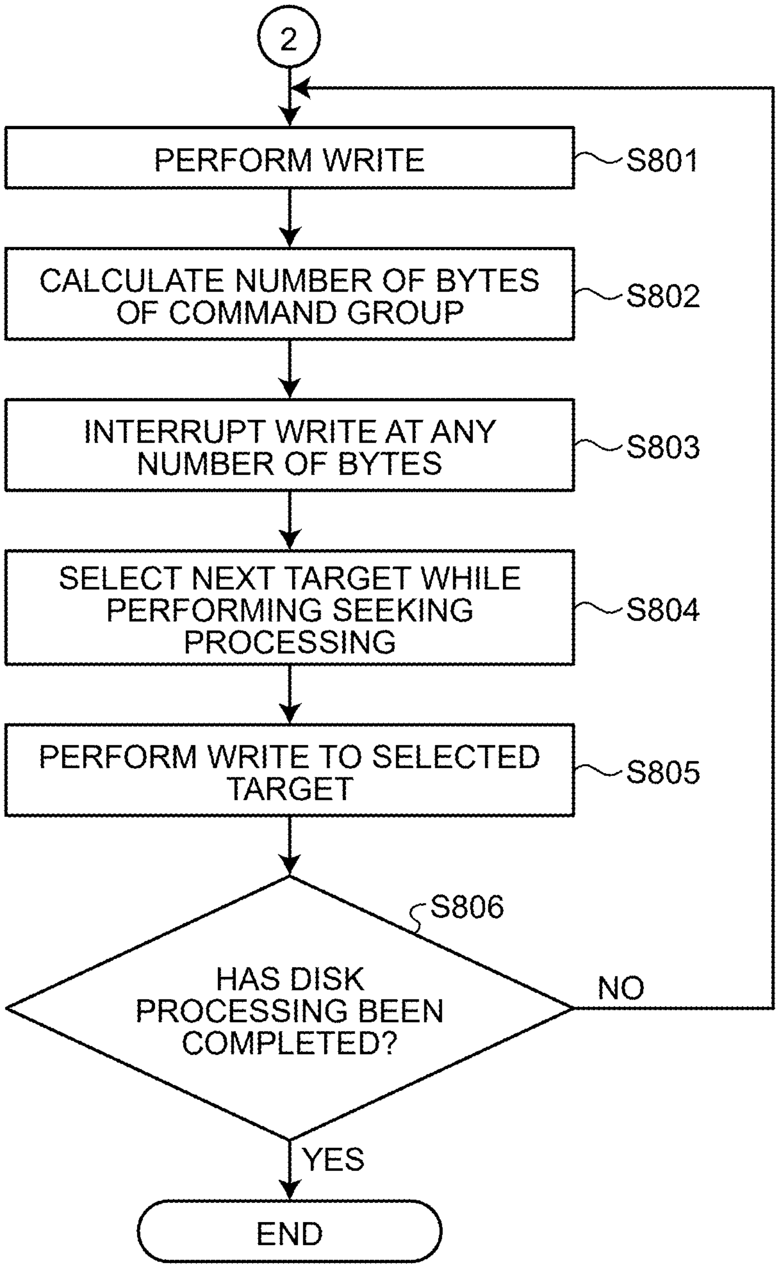
FIG. 9 is a flowchart illustrating an example of processing contents in a case where the controller according to the embodiment determines that the command pattern transmitted from the host is switched by the number of bytes.

FIG. 9 is a flowchart illustrating an example of the processing contents in a case where the controller according to the embodiment determines that the command pattern transmitted from the host is switched by the number of bytes.

In FIG. 9, the controller 30 performs sequential write (S801).

Next, the calculation unit 281 calculates the number of bytes of the command group by the above-described method of calculating the number of bytes (S802).

Then, when the number of bytes at which write is interrupted is reached at the time when a scheduler set by the setting unit 283 is switched, the controller 30 interrupts the sequential write (S803).

For example, it is assumed that the calculation unit 281 calculates the number of bytes determined by the above-described method of calculating the number of bytes as 1 GiB. When the setting unit 283 sets "interruption of sequential write at the time of 98% arrival of the number of bytes of the command group", the command processing is interrupted at the time point of arrival at 0.98 GiB.

Next, the controller 30 performs seeking, and selects a target destination of the magnetic disk 11 to which a command group transmitted from the host 2 is to be written next (S804).

Then, the controller 30 performs sequential write on the next command group to the selected target destination (S805).

The controller 30 continues the sequential write. When disk processing is completed (S806: Yes), the processing ends. When the disk processing remains yet (S806: No), the processing is performed again from S801.

In a comparative example, a case where a pattern for switching a command is not correct and a case where seeking is not optimized will be described below.

Figure 10:
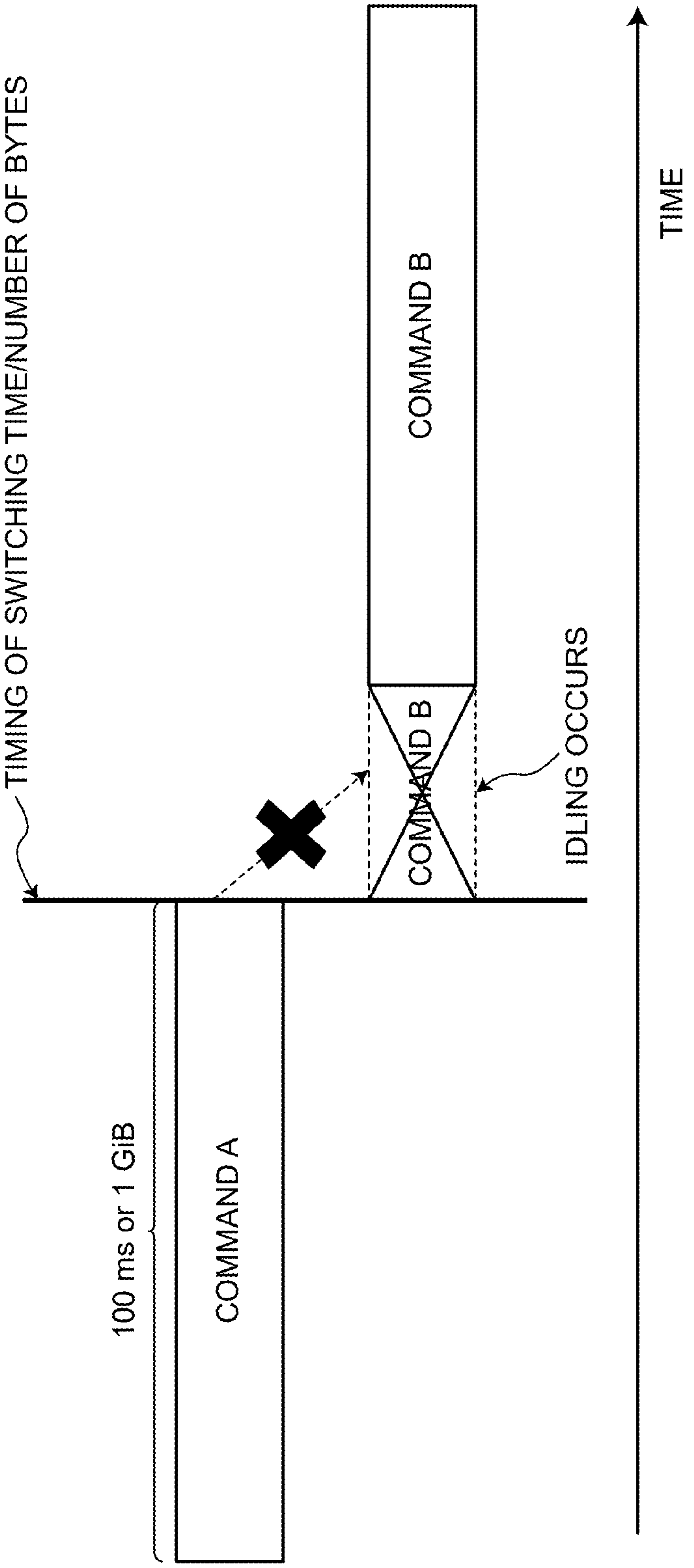
FIG. 10 illustrates an example of command processing in a case where a pattern for switching a command according to a comparative example is not correct and a case where seeking is not optimized.

FIG. 10 illustrates an example of command processing in a case where a pattern for switching a command is not correct and a case where seeking is not optimized according to the comparative example. In FIG. 10, the horizontal axis represents time.

In FIG. 10, sequential write processing of a command group is assumed in which the time and the number of bytes calculated by the calculation unit 281 are calculated as 100 ms and 1 GiB, respectively.

In the case where a pattern for switching a command is not correct and the case where seeking is not optimized, useless idling occurs and the transfer rate decreases since the controller 30 cannot predict when a target destination for write is switched even if the host 2 performs transmission for switching a command pattern from the command group of the commands A to the command group of the commands B.

In contrast, the magnetic disk device 1 according to the embodiment determines, on the side of the magnetic disk device 1, whether the I/O scheduler 7 mounted on the host 2 switches a scheduler by the CFQ or by the BFQ. The magnetic disk device 1 thus records any number of command requests including a plurality of command groups, and calculates a command switching time and a transfer rate. Then, the calculated transfer rate is compared with the reference transfer rate to determine whether the operation is performed in the CFQ or in the BFQ. This enables command processing in accordance with the type of the I/O scheduler 7 on the side of the magnetic disk device 1. Useless seeking decreases. An idling occurrence rate decreases. A transfer rate is improved. Drive performance can thereby be improved.

Furthermore, the magnetic disk device 1 according to the embodiment switches sequential write by a time set by the setting unit 283 and performs processing when first processing a designated command group among a plurality of command groups in sequential write processing performed on a command pattern including the plurality of command groups. After the processing on the designated command group is completed and the time when the designated command group is switched to another command group is determined, the magnetic disk device 1 switches the I/O scheduler 7 by the determined time. According to the embodiment, a transfer rate can thus be improved in processing after the time when a designated command group is switched to another command group is determined. This can improve the drive performance even in processing in a stage in which processing of a logged command is not completed.

Furthermore, the magnetic disk device 1 according to the embodiment causes the calculation unit 281 to calculate a transfer rate of a designated command group from the logged command pattern, and compares the transfer rate with the reference transfer rate set by the setting unit 283. When the determined transfer rate exceeds the reference transfer rate set by the setting unit 283, the determination unit 282 determines that the I/O scheduler 7 mounted on the host 2 operates in the CFQ. According to the embodiment, the magnetic disk device 1 can thereby determine that the I/O scheduler 7 mounted on the host 2 operates in the CFQ. Appropriate processing can be performed on command processing transmitted from the host 2 by the CFQ on the side of the magnetic disk device 1. Drive performance can be improved.

Furthermore, when the controller 30 determines that the host 2 operates in the CFQ, the magnetic disk device 1 according to the embodiment switches thread processing by time based on the time of switching of a command having a command pattern calculated at the time of performing sequential write of a command request including a plurality of command groups, and optimizes the seeking timing such that a data sector of a write destination target is selected in time. According to the embodiment, seeking timing is thereby optimized when the I/O scheduler 7 mounted on the host 2 operates in the CFQ. Useless seeking decreases. An idling occurrence rate decreases. A transfer rate can be improved. Drive performance can thereby be improved.

Furthermore, the magnetic disk device 1 according to the embodiment causes the calculation unit 281 to calculate a transfer rate of a designated command group from the logged command pattern, and compares the transfer rate with the reference transfer rate set by the setting unit 283. When the determined transfer rate does not exceed the reference transfer rate set by the setting unit 283, the determination unit 282 determines that the I/O scheduler 7 mounted on the host 2 operates by the BFQ. According to the embodiment, the magnetic disk device 1 can thus determine that the I/O scheduler 7 mounted on the host 2 operates in the BFQ. Appropriate processing can be performed on command processing transmitted from the host 2 by the BFQ on the side of the magnetic disk device 1. Drive performance can be improved.

Furthermore, when the controller 30 determines that the host 2 operates in the BFQ, the magnetic disk device 1 according to the embodiment calculates the number of bytes based on the transfer rate of a command having a command pattern calculated at the time of performing sequential write of a command request including a plurality of command groups, switches the thread processing by the determined number of bytes, and optimizes the seeking timing such that a data sector of a write destination target is selected in time. According to the embodiment, the seeking timing is thus optimized when the I/O scheduler 7 mounted on the host 2 operates in the BFQ. Useless seeking decreases. An idling occurrence rate decreases. A transfer rate can be improved. Drive performance can thereby be improved.

Although, in the embodiment, description has been given by using Linux (registered trademark) as an example of the OS 5, this is not a limitation. For example, the embodiment can also be applied to the OS 5 other than Linux (registered trademark) as long as the OS 5 adopts the first scheduler switching system or the second scheduler switching system. In the first scheduler switching system, a scheduler is switched by a certain time for a command group including a plurality of write command requests. In the second scheduler switching system, the scheduler is switched by the certain number of bytes for the command group.

Although, in the embodiment, the first scheduler switching system of the I/O scheduler 7 is described by using the CFQ as an example, this is not a limitation. For example, the embodiment can be applied to the first scheduler switching system other than the CFQ as long as the first scheduler switching system is adopted as the scheduler switching system. In the first scheduler switching system, switching is performed by a certain time for a command group including a plurality of write command requests.

Although, in the embodiment, the second scheduler switching system of the I/O scheduler 7 is described by using the BFQ as an example, this is not a limitation. For example, the embodiment can also be applied to the second scheduler switching system other than the BFQ as long as the second scheduler switching system is adopted as the scheduler switching system. In the second scheduler switching system, switching is performed by the certain number of bytes for a command group including a plurality of write command requests.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A magnetic disk device to be connected to a host, wherein the host includes an input/output scheduler that groups command requests by any units, the input/output scheduler operates in one of a first scheduler switching system and a second scheduler switching system, switching being performed by a certain time for a command group including a plurality of write command requests in the first scheduler switching system, switching being performed by a certain number of bytes for the command group in the second scheduler switching system, the magnetic disk device comprises:

a magnetic disk including a plurality of tracks and including a plurality of data sectors on each of the plurality of tracks;

a magnetic head that operates in response to command requests of read and write on the plurality of data sectors of the magnetic disk; and a controller that performs control at a time of performing read and write on the plurality of data sectors with the magnetic head in response to the command requests when receiving, from the host, a command pattern that includes a plurality of command groups and in which the plurality of command groups are switched at certain timing, and the controller:

records any number of command requests while processing a command request that has been received;

determines a transfer rate from a command request that has been recorded, to record the transfer rate; and compares the transfer rate that has been determined with a reference transfer rate, to determine whether the input/output scheduler operates in the first scheduler switching system or in the second scheduler switching system based on a comparison result.

2. The magnetic disk device according to claim 1, wherein when the controller performs sequential write of the plurality of command groups on the data sector, the controller switches the sequential write by a predetermined time to perform processing in a case of first processing a designated command group among the plurality of command groups in the command pattern, and switches the input/output scheduler by a determined time during which the designated command group that has been recorded is switched to another command group, after processing of the designated command group is completed and the time is determined.

3. The magnetic disk device according to claim 2, wherein in a case where the transfer rate exceeds the reference transfer rate, the controller determines that the input/output scheduler operates in the first scheduler switching system.

4. The magnetic disk device according to claim 3, wherein when determining that the input/output scheduler operates in the first scheduler switching system, the controller switches thread processing by time, and optimizes seeking timing such that the data sector of a write destination target is selected in time.

5. The magnetic disk device according to claim 2, wherein in a case where the transfer rate does not exceed the reference transfer rate, the controller determines that the input/output scheduler operates in the second scheduler switching system.

6. The magnetic disk device according to claim 5, wherein when determining that the input/output scheduler operates in the second scheduler switching system, the controller switches thread processing by a number of bytes, and optimizes seeking timing such that the data sector of a write destination target is selected in time.

7. A method of recording data to be executed in a magnetic disk device, wherein the magnetic disk device is connected to a host, the host includes an input/output scheduler that groups command requests by any units, the input/output scheduler operates in one of a first scheduler switching system and a second scheduler switching system, switching being performed by a certain time for a command group including a plurality of write command requests in the first scheduler switching system, switching being performed by a certain number of bytes for the command group in the second scheduler switching system, the magnetic disk device:

includes a plurality of tracks and includes a plurality of data sectors on each of the plurality of tracks;

operating in response to command requests of read and write on the plurality of data sectors of the magnetic disk; and performing control at a time of performing read and write on the plurality of data sectors with a magnetic head in response to command requests when receiving, from the host, a command pattern that includes a plurality of command groups and in which the plurality of command groups are switched at certain timing, and the method comprising:

recording any number of command requests while processing a command request that has been received;

determining a transfer rate from a command request that has been recorded, to record the transfer rate; and comparing the transfer rate that has been determined with a reference transfer rate, to determine whether the input/output scheduler operates in the first scheduler switching system or in the second scheduler switching system based on a comparison result.

8. The method of recording data according to claim 7, wherein in a case where sequential write of the plurality of command groups is performed on the data sector, the sequential write is switched by a predetermined time to perform processing in a case of first processing a designated command group among the plurality of command groups in the command pattern, and the input/output scheduler is switched by a determined time during which the designated command group that has been recorded is switched to another command group, after processing of the designated command group is completed and the time is determined.

9. The method of recording data according to claim 7, wherein in a case where the transfer rate exceeds the reference transfer rate, it is determined that the input/output scheduler operates in the first scheduler switching system.

10. The method of recording data according to claim 9, wherein in a case where it is determined that the input/output scheduler operates in the first scheduler switching system, thread processing is switched by time, and seeking timing is optimized such that the data sector of a write destination target is selected in time.

11. The method of recording data according to claim 7, wherein in a case where the transfer rate does not exceed the reference transfer rate, it is determined that the input/output scheduler operates in the second scheduler switching system.

12. The method of recording data according to claim 11, wherein in a case where it is determined that the input/output scheduler operates in the second scheduler switching system, thread processing is switched by a number of bytes, and seeking timing is optimized such that the data sector of a write destination target is selected in time.

* * * * *